METHOD AND MEANS FOR ANTI-JAMMING IN RADIO

Filed March 6, 1945 2 Sheets-Sheet 1

LEONIDE E. GABRILOVITCH
INVENTOR.

BY John P. Nikonov

ATTORNEY

May 24, 1955 L. E. GABRILOVITCH 2,709,218

METHOD AND MEANS FOR ANTI-JAMMING IN RADIO

Filed March 6, 1945 2 Sheets-Sheet 2

LEONID E. GABRILOVITCH
INVENTOR.

BY John P. Nikonow
ATTORNEY 2,709,218
Patented May 24, 1955

2,709,218

METHOD AND MEANS FOR ANTI-JAMMING IN RADIO

Leonide E. Gabrilovitch, New York, N. Y.

Application March 6, 1945, Serial No. 581,268
3 Claims. (Cl. 250—6)

The present invention relates to methods and means for protecting radio communications against interference and more particularly against intentional attempts of distorting or even blocking such communications. One of the most important problems in this field consists in protecting remote control and radar signalling against enemy jamming. There exist, however, many other practical problems whose solution requires an efficient protection of radio communications against accidental or intentional distorting.

The main features of this invention are as follows:

1. The controlling signals are transmitted on a sub-carrier whose phase or frequency is made to vary in accordance with a predetermined pattern (for instance, by inverting periodically the sign of the sub-carrier).

2. At the reception end, the modulated phase-varied, or frequency-varied sub-carrier is demodulated to provide the signal current, which may be then selected by a corresponding band-pass filter. However, no perfect demodulating effect can be obtained if the demodulating oscillation has either a constant phase (or frequency) or a variable phase (or frequency) whose variations do not faithfully reproduce those of the modulated phase-varied (or frequency-varied) sub-carrier which is being demodulated. As the enemy does not know the pattern of the phase-variations (or frequency-variations) used for modulating the carrier, and as no existing means (such as, for instances, a panoramic receiver) can enable him to discover this pattern, the signals transmitted by him will be rejected by the receiving arrangement and no distorting effect will be obtained.

3. The phase variations (or frequency variations) employed according to this invention are characterized by three principal parameters, namely, (*a*) By their frequency.

(*b*) By their phase.

(*c*) By their shape (their curve plotted as a function of time may have the form of a sine-wave, of a triangular wave, of a square wave, of a rectified sine-wave, etc.).

The first of these three parameters i. e., the frequency of the phase (or frequency variations) is extremely critical. As to the two others, they admit, at least in some cases, comparatively large tolerances.

4. In order to reproduce, at the reception end, the precise pattern of the phase or frequency-variations characterizing the modulated phase-varied sub-carrier on which are impressed the signal-currents, the phase-varying (or frequency-varying) operations performed at the transmission end and at the reception end must be synchronized. This result is obtained in the proposed arrangement by transmitting a standard frequency which will be equal either to the frequency of the employed phase-variations or to a determined harmonic or sub-harmonic of that frequency.

5. It is one of the main features of the proposed system that therein the foregoing "standard frequency" is transmitted in the form of phase variations or frequency variations, so that this frequency cannot be discovered or reproduced by the enemy. The employed method consists substantially in submitting the incoming phase-varied or frequency-varied sub-carrier, on which is impressed the signal current, to two combined operations, one of which provides the frequency of the used phase variations or frequency variations, while the second furnishes the demodulated signal currents.

In accordance with the foregoing, the main object of the invention consists in providing a method of protecting radio signals against jamming by transmitting these radio signals on phase-varied or frequency-varied carriers or sub-carriers and by demodulating these carriers or sub-carriers, at the reception end, with the aid of demodulating oscillations undergoing exactly the same phase-variations or frequency-variations, as those used at the transmission end.

Another object of the invention is to synchronize the phase or frequency variations used at the reception end, with those used at the transmission end, by transmitting a frequency standard from which these variations are derived on both the transmission and the reception ends, in a nearly identical way.

A further object of the invention is to transmit the frequency standard in such a form that it could not be detected by the enemy without the use of so-called cryptographic means, for example, in the form of phase or frequency variations whose frequency is identical either to the frequency of the variations used, or to a determined harmonic or sub-harmonic of said frequency.

Still a further object of the invention is to render ineffective the action of not perfectly demodulated signals, whereby it is proposed to introduce a special step based on the fact that a properly demodulated phase-varied or frequency-varied sub-carrier provides only two elements, namely: (1) the signal, and (2) a wave modulated by the signal and having a carrier frequency double that of the sub-carrier used, while a phase-varied, or frequency-varied sub-carrier which is demodulated by a demodulating oscillation, which does not undergo exactly the same phase or frequency variations, provides, in addition to the two above-mentioned elements, a plurality of additional oscillations.

The other objects, advantages and features of the invention will be better understood from the following description, illustrated by the accompanying drawings wherein:

Fig. 1 represents in a purely illustrative way one of the possible embodiments of a transmitting arrangement designed in accordance with the invention to protect remote control or radar signalling. In this particular illustrative example it is assumed that the signals are transmitted on phase-varied sub-carriers.

Figure 1:
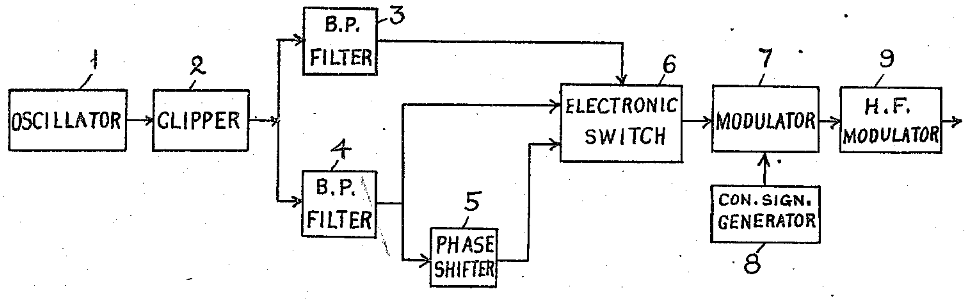
Fig. 1 is a schematic block diagram of a transmitting arrangement designed in accordance with the invention.

The phase-varied sub-carrier, according to this invention, is produced as follows:

A low-frequency oscillator 1 (whose stability, although desirable, cannot be considered as critical) generates a low-frequency oscillation, for example, of several hundred cycles per second. This low frequency continuous wave is conveyed to the clipper (limiter) 2, which transforms the oscillation in question into a square wave, i. e., into a plurality of waves constituted of the output of oscillator 1 and of a sequence of its odd harmonics.

The output of clipper 2 is divided into two parallel channels, each of which comprises a band-pass filter 3 and 4. Filter 4 is designed to select the sub-carrier, which is supposed to have a rather high frequency (for instance, of the order of magnitude of 20,000 cycles per second). As to filter 3, it selects the oscillation designed to control the frequency of the phase variations of the sub-carrier selected by filter 4. It is advisable to choose a frequency of the phase variations which is higher than that of the highest signal current employed. For example: if the frequencies of the signal currents range from 300 to 3000 cycles per second, the frequency of the phase variations should be not lower than 3500 cycles. Filter 3 can be replaced by a certain number of band-pass filters having different "tunings" (for example, instead of a single filter whose passing band is located between 5200 and 5600 cycles, there can be used several filters corresponding respectively, for instance, to the 17, 19, 21, 23, 25, 27, etc., harmonics of the low frequency wave supplied by oscillator 1. These filters can be switched on in turn, in accordance with a predetermined pattern or with the help of special controlling signals. The simplest way of proceeding would be to control the switching of the filters by the signals themselves, as, for instance, by selective relays each of which is responsive to a predetermined frequency, and each of which is provided with a predetermined time lag mechanism for delaying the operation of the relay after it has been acted upon by the controlling frequency. The signal source 8 provides in one way or another a certain number of signal currents, having different frequencies. Let us assume that 12 such currents are used, and that B. P. filter 3 is replaced by 12 B. P. filters tuned to 12 different harmonics of the oscillation generated by oscillator 1 and transformed into a square wave by clipper (limiter) 2. A switching arrangement should be provided designed to insert at any given moment one of the 12 B. P. filters in the branch connecting clipper 2 with the control input of the electronic switch 6. Let it be assumed that the switching operation is effected by selective relays each of which is responsive to a predetermined frequency. Let it be assumed, moreover, that each of the relays is provided with a special arrangement producing a predetermined time lag in the operation of the particular relay after it has been acted upon by the controlling frequency. The control operation consists in impressing the required signal current on the sub-carrier. This is done by conveying the selected signal current to modulator 7. The same signal current can be simultaneously conveyed to the foregoing switching arrangement designed to insert at any given moment one of the 12 B. P. filters in the branch connecting clipper 2 with the control input of the electronic switch 6. The signal current in question will evidently act only on the selective relay which is tuned to its frequency. The result will be that the B. P. filter which was inserted between 2 and 6 at the moment when the particular signal current has become effective, will be switched off (after a certain predetermined expectation period) and another B. P. filter will be switched in. In such a way, any transmitted signal will change the frequency of the phase variations of the sub-carrier used. It is evident that it is also possible to vary this frequency in accordance with the predetermined pattern or by controlling the switching of the B. P. filters by special signals other than those supplied by the source 8, so that each signal current would switch on a determined filter for the next signal, obviously, with a certain time lag).

A similar system could be used for changing the frequency of the employed sub-carrier.

The output of filter 4 (constituted by the employed sub-carrier) is divided into two parallel channels, one of which comprises a de-phasing device 5 (which may be a simple buffer producing a phase shift of 180° or any other simple phase shifter). Both channels are conveyed to the electronic switch 6 synchronized by the output of filter 3 (i. e., by the oscillation controlling the frequency of the phase variations). The electronic switch may be of any type, such as, for instance, is used in oscilloscopes, for instance, the Du Mont electronic switch, type 185–A. The output of the electronic switch 6 will be evidently constituted of the phase-varied sub-carrier.

The reference character 7 designates a double-balanced modulator designed to impress the signal current on the phase-varied sub-carrier. The signal currents are provided by the arrangement 8.

The output of the double-balanced modulator is fed to the high frequency modulation stage of the radio transmitter, to be impressed on the high frequency carrier.

Figure 2:
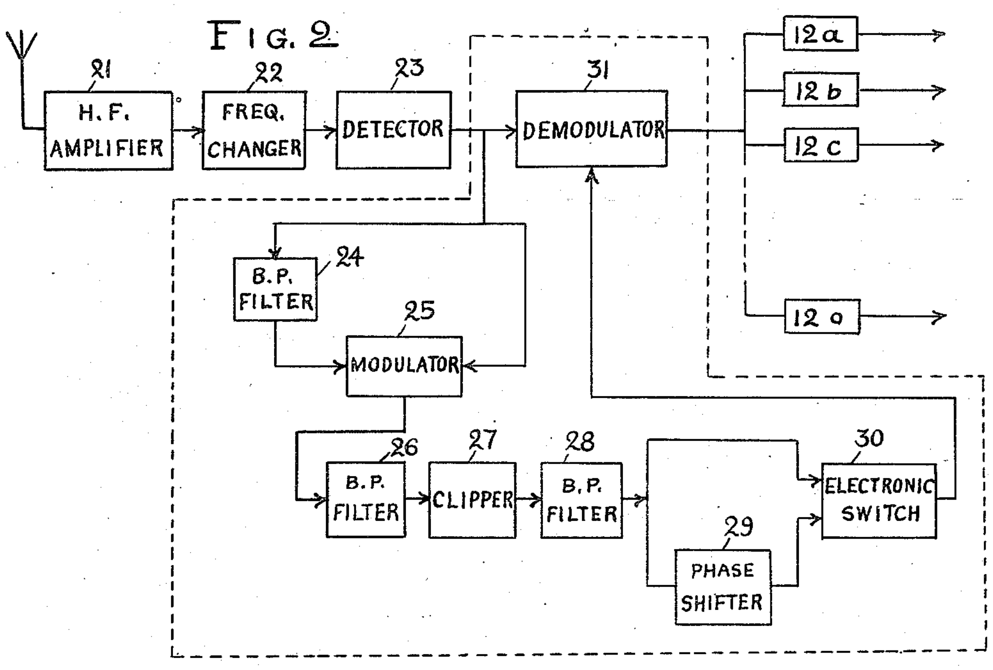
Fig. 2 is a block diagram of a receiving arrangement corresponding to the transmitting arrangement shown on Fig. 1.

Fig. 2 represents in a purely illustrative way, a receiving arrangement designed to intercept the signalling sent out by the transmitting arrangement shown on Fig. 1.

The corresponding block diagram represents a special radio-receiver as used in most of the existing remote control arrangements at the reception end. The elements of this receiver are designated respectively by the reference characters 21, 22, 23—30, **12*a*, 12*b*—12*o***. The additional arrangement designed to secure the protection against jamming is included in a frame drawn in dotted lines.

The input of this additional arrangement is directly connected with the output of detector 23, which evidently provides, at any given moment when a signal is sent out by the transmitter, a determined phase-varied sub-carrier modulated by one of the signal currents.

This modulated phase-varied sub-carrier is conveyed through two parallel channels, one of which includes the band-pass filter 24, whose selection field is limited by the sum and the difference of the frequency of the used sub-carrier and of that of the transmitted signal current.

The incoming phase-varied sub-carrier can be analytically expressed as follows: $\sin \Omega t \sin [\omega t + \varphi(t)]$ in which expression $\Omega = 2\pi F$, F being the frequency of the signal current: $\omega = 2\pi f$, $f$ being the frequency of the sub-carrier; $\varphi(t)$ designates the varied phase of the sub-carrier.

Under those conditions, the passing band of filter 24 is located between the frequency $f-F$ and $f+F$.

If the frequency of the phase variations is greater than F, the output of filter 24 will be no more a phase-varied oscillation. It will be a modulated wave having a constant carrier phase; the analytical expression of which will be: $\sin \Omega t \sin \omega t$.

The two parallel channels into which is divided the output of detector 23 are conveyed to modulator 25. One of these channels carries the phase-varied modulated sub-carrier $$\sin \Omega t \sin [\omega t + \varphi(t)]$$

while the second (passing through filter 4) feeds to the modulator 5 the wave $\sin \Omega t \sin \omega t$ having a constant carrier phase.

The output of the (double-balanced) modulator 25 (constituted, for instance, of copper oxide cells) will have the form of the product $$\sin \Omega t \sin [\omega t + \varphi(t)] \sin \Omega t \sin \omega t$$

which product is equal to a half of the difference:

$$\sin^2 \Omega t \cos [\varphi(t)] - \sin^2 \Omega t \cos [2\omega t + \varphi(t)] = \tfrac{1}{2}(1 - \cos 2\Omega t) \cos [\varphi(t)] - \tfrac{1}{2}(1 - \cos 2\Omega t) \cos [2\omega t + \varphi(t)]$$

The above expressions are derived as follows: as stated above, a phase-varied wave constitutes a frequency band whose components are located around wave carrier frequency of said band. The structure of the thus produced spectrum is defined by Bessel's functions. If phase-varied wave is submitted to a band pass filtering whereby the width of the employed band pass filter is smaller than the frequency of the phase variations, the phase-varied wave is evidently transformed into a wave having a constant phase. Any handbook having a section devoted to phase modulations contains an explanation of these results. As mentioned above (column 3, lines 10 to 12), the phase variation employed in accordance with the invention should have a higher frequency than the highest frequency of the signals used. In other words: $n$ is greater than F (maximum). The band pass filter 24 is designed in such a way that it considerably weakens the frequencies $f+n$ and $f-n$, without attenuating the frequencies $f+F$ and $f-F$. This means that the phase-varied signal wave:

$$\sin \Omega t \sin [\omega t+\varphi(t)]$$

is transformed by band-pass filter 24 into a modulated wave having a constant phase, expressed as follows:

$$\sin \Omega t \sin \omega t$$

Consequently, modulator 25 is acted upon by a phase-varied wave, coming directly from detector 23, and a wave having a constant phase coming from band-pass filter 24. Modulator 25 evidently provides the product of these two waves, which product obviously has the form:

$$\sin \Omega t \sin [\omega t+\varphi(t)] \sin \Omega t \sin \omega t$$

Now, the product of two sines is equal to one-half the difference of two cosines of the two cosines as indicated above. (See also F. E. Therman, "Radio Engineer's Handbook," 1943, p. 582, and K. Henney, "Radio Engineer's Handbook," 1941, p. 325.)

It can be readily seen that this difference contains a term representing the cosine of $2\pi nt$, $n$ being the frequency of the employed phase variations. In fact, as stated above, the symbol $\varphi(t)$ designates the variable phase undergoing in time. Now, a wave whose phase is periodically varied, constitutes a frequency band which can be calculated with the aid of Bessel functions. It can be readily seen that this frequency band surrounds the carrier frequency of the considered wave and that it includes components whose frequencies differ from said carrier frequency by a number of cycles equal to that of the phase variations. In other words, if $n$ is a frequency of the phase variations, the frequency band referred to above will contain the following components: $\sin(\omega+2\pi n)t$ and $\sin(\omega-2\pi n)t$. The band-pass filter 26 is designed to select this term. Consequently, said filter has to be materialized in the form of a band-pass filter having an extremely narrow passing band, for instance, in the form of a quartz crystal filter.

The output of this filter 26 is divided into two parallel channels, one of which does not contain any additional element, while the second is conveyed to the clipper 27, transforming this output into a square wave, constituted by the same sequence of oscillations as the output of clipper 2 in the transmitter. The band-pass filter 28 selects out of this sequence an oscillation having exactly the same frequency as the incoming sub-carrier.

The output of filter 28 is divided into two parallel channels, one of which contains a phase-shifting device 29 identical to that employed in the transmitter wherein it is designated by the reference character 5. Both parallel channels are conveyed to the electronic switch 30 synchronized by the frequency provided by band-pass filter 26 and constituting the first channel of the output of said filter.

The output of detector 23 is conveyed through a third channel to the double-balanced demodulator 31 which is at the same time submitted to the action of the output of the electronic switch 30.

It is obvious that the output of demodulator 31 will be constituted by the properly demodulated signal current, which is then selected by one of the signal current filters designated respectively by 12$a$, 12$b$ . . . 12$o$.

Figure 3:
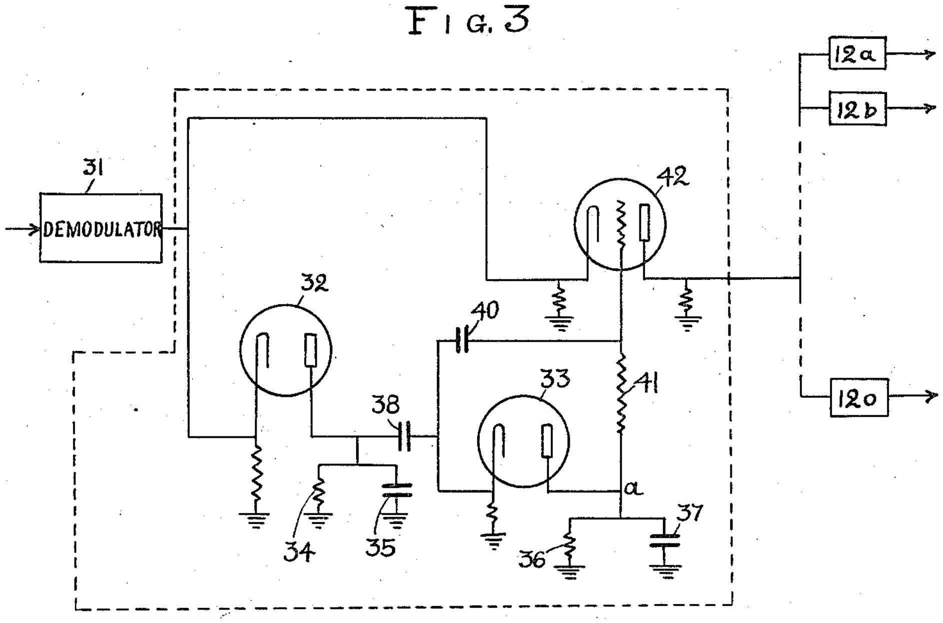
Fig. 3 is a schematic diagram of an additional arrangement to be inserted in that represented in Fig. 2, in order to enhance the accuracy of its performance.

Fig. 3 is a schematic diagram representing in a purely illustrative way a special part which can be inserted in a receiving arrangement designed in accordance with the invention, in order to prevent interference even in such cases when the enemy succeeds in producing jamming sub-carriers, whose frequency and phase variations are very close to those of our own signals.

It is assumed that the signal currents are transmitted on a phase varied sub-carrier (of 15,000–25,000 cycles), whose phase variation consists in a periodical invertion of polarity or sign. This result is obtained in practice by dividing the output of the arrangement providing the sub-carrier into two parallel channels, in one of which is included a buffer, while the second does not contain any additional element. It is obvious that the two channels will be out of phase by 180°. They are both fed to an electronic switch synchronized by a special oscillation controlling the frequency of the periodical inversion.

It is evident that if modulated sub-carriers constituted as just described are demodulated with the help of oscillations having a constant phase, there will be obtained signal currents undergoing the same periodical inversion of polarity or sign as that of the employed sub-carrier. If the frequency of this periodical inversion is appreciably higher than that of the highest signal current, a selector or a band-pass filter having a very narrow passing band and "tuned" to the frequency of a given signal current, will eliminate the thus periodically inverted signal, so that the enemy will not succeed in creating interference by using sub-carriers having constant phases.

Now, let it be assumed that the enemy also uses phase varied sub-carriers whose polarity is periodically inverted. Let us assume, moreover, that incidentally or with the help of some means whose nature cannot be foreseen, the enemy succeeds in producing a frequency of phase variations, which is very close to that used by ourselves. As it is practically impossible for the enemy to extract this frequency from our own transmission, he must produce it, let us say, by local means, using, for instance, local oscillators. It is evident that, under such conditions, a complete identity of the used frequencies of phase variations is unobtainable. In fact, any oscillator drifts so that even if at a certain moment the frequency of the phase variations produced by the enemy will coincide with the frequency used by ourselves, this result will never be stable. The two oscillators will be very soon out of synchronism and will remain in such condition for most of the time. It must be added that even the incidental instantaneous identity of frequencies will happen only exceptionally as its probability is extremely low.

Now, what will happen if the frequency of the periodical inversion of polarity used by the enemy is different from that used by ourselves, although very close to it? Instead of the properly demodulated signal current, there will be obtained a signal current modulated by the difference of the two frequencies in question and by a sequence of harmonics of said difference.

An arrangement must be included in the receiver which eliminates the thus modulated signal currents, but which at the same time maintains the non-modulated signal current. In this way the enemy jamming signals will be suppressed while our own signals will be picked up.

A schematic diagram of such an additional selection arrangement is represented on Fig. 3.

As shown on the diagram, the arrangement in question (included on the drawing in a frame drawn in dotted lines) is inserted between the output of demodulator 31 and the group of signal current filters 12$a$, 12$b$ . . . 12$o$ (see Fig. 2).

As it will be remembered, the demodulator 31 is designed to perform the demodulating of the phase varied sub-carrier on which are impressed the signal currents. In normal conditions the modulated phase varied sub-carrier is made to beat with an oscillation having exactly the same frequency and undergoing exactly the same phase variation. The output of demodulator 31 is, under those circumstances, constituted by the properly demodulated signal current which is then selected by the corresponding signal current filter.

If the demodulating oscillation having the same frequency as that of the used sub-carrier undergoes phase variations which are very similar to those of said sub-carrier but not identical with them, the output of demodulator 31 will be constituted by the signal current modulated by a very low frequency and a sequence of its harmonics.

The input of the additional arrangement (connected to the output of demodulator 31 is divided into two parallel channels. One of these channels contains a thermionic tube put in circuit in a peculiar way in accordance with applicant's United States Patents Nos. 2,240,500 and 2,295,207. The thermionic tube used in such a way is designated by applicant as diode with grid and performs as a special selection instrument, as will be described below. The second channel is constituted by two ordinary diodes 32 and 33, designed to derive from the output of demodulator 31 a negative variable voltage to be applied to the grid of the diode with grid.

The output of the diode 32 is constituted like that of an ordinary detector, of a resistance 34 and a condenser 35, put in parallel.

The values of 34 and 35 are to be chosen as follows:

Let it be assumed that the phase variation used by ourselves and by the enemy consists of a periodical inverting of polarity and that there is a slight difference between the frequency of this inversion used by us and that used by the enemy. If this difference is designated by $\Delta f$, we can define a second symbol $\epsilon$ by the equation $\epsilon=2\pi\Delta f$. If the frequency of the used signal current is designated by F and if we define the symbol $\Omega$ by the equation $\Omega=2\pi F$ the output current of demodulator 31 (during jamming attempts produced by the enemy) will have the following expression:

$$\sin \epsilon t \sin \Omega t$$

In order to have a complete and precise picture, it would be evidently necessary to add to the above terms some terms $$\sin 3\epsilon t \sin \Omega t, \sin 5\epsilon t \sin \Omega t, \sin 7\epsilon t \sin \Omega t, \text{etc.}$$

i. e., some terms wherein $\epsilon$ is replaced by an odd multiple of $\epsilon$.

It is, however, easy to realize that for a proper analytical consideration, it suffices to take into account the first term of the sequence, namely $\sin \epsilon t \sin \Omega t$. If this term is impressed on the cathode of the diode $D_1$, (32) the output of the latter will be constituted almost exclusively by the square term $\sin^2 \epsilon t \sin^2 \Omega t$ which is equal to $$\tfrac{1}{2}(1-\cos 2\epsilon t)\tfrac{1}{2}(1-\cos 2\Omega t)$$

The values $r_1$ and $C_1$ respectively of 34 and 35, and especially 35, must be such that all the resulting terms except $\cos.2\epsilon t$ will be substantially attenuated. This will happen when $$\frac{1}{c_1 2\epsilon}$$

is great, with respect to $C_1$ and $$\frac{1}{C_1 2\Omega}$$

$C_2$ (38) is a connecting condenser, having a comparatively high capacity. Its output is divided into two parallel channels, one of which conveys the term $\cos 2\epsilon t$ through a condenser 40 to the grid of the diode with grid. The second channel feeds the term $\cos 2\epsilon t$ to the cathode of the second diode 33 whose output is constituted by the resistor 36 and the condenser $C_4$ (37) put in parallel.

The condenser 37 must have an appropriate value $C_4$, so as to substantially attenuate the resulting term $\cos 4\epsilon t$ (this means that the value $$\frac{1}{C_4 4\epsilon}$$

must be small).

Under those conditions there appears in the output of 33 only and exclusively a direct current, which creates a constant difference of potential between the point *a* and the ground. The point *a* is connected with the grid of the diode with grid through the resistor 41.

It is easy to choose such values $r_3$ and $C_3$ respectively for resistor 41 and condenser 40 that there will be applied to the grid of the diode with grid a variable negative voltage having the following form:

$$-1+\cos 2\epsilon t$$

which expression is equivalent to $-\sin^2 \epsilon t$. It should be noted that the output of demodulator 31 does not include switching frequency, i. e., frequency of phase variations, but only signal currents modulated by the difference between two switching frequencies.

It has been proved analytically and experimentally by applicant (see his U. S. Patents Nos. 2,240,500 and 2,295,207, and especially his corresponding British Patent No. 504,455 containing detailed analytical developments) that if the cathode-anode circuit of a diode with grid is acted upon by a frequency or frequency band modulated by a low frequency current (such as in our case $\sin \epsilon t$), and if at the same time the grid of the diode with grid in question is submitted to the action of a variable negative voltage, having the form $$-\sin \epsilon t \text{ or } -\sin^2 \epsilon t$$

the incoming plurality acting on the cathode-anode circuit of the tube will be substantially attenuated. It should be noted that the output of demodulator 31 does not include switching frequency, i. e., frequency of phase variations, but only signal currents modulated by the difference between two switching frequencies.

Any frequency or plurality of frequencies not modulated by the low frequency in question, i. e., by $\sin \epsilon t$, will be weakened in a considerably smaller proportion.

It can be readily realized that under those conditions the arrangement represented on Figure 3 will practically suppress any jamming signal sent by the enemy, which signal will appear in the output of demodulator 31 in the form of a signal current, modulated by a sequence of very low frequencies. On the other hand, the arrangement referred to will maintain any signal transmitted by ourselves, which signal will appear in the output of demodulator 31 in the form of a non-modulated signal current.

Figure 4:
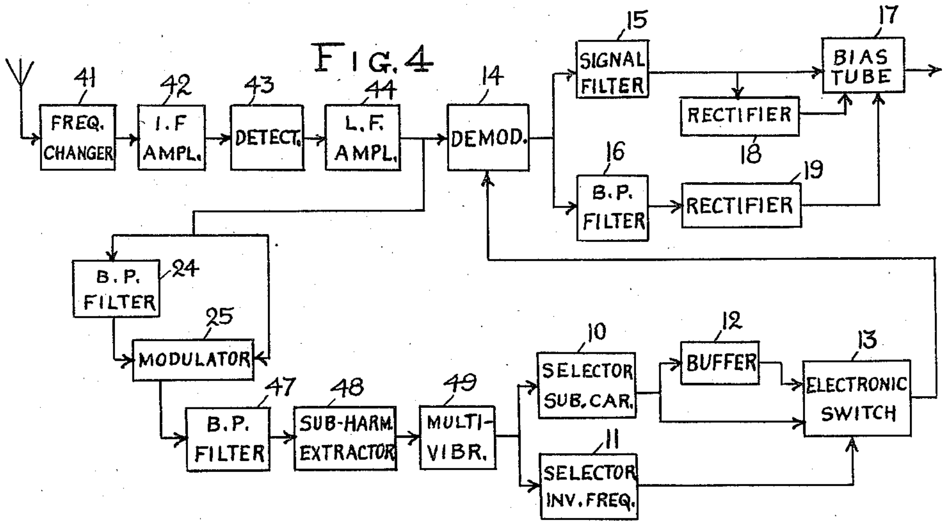
Fig. 4 is a block diagram of a receiving arrangement designed in accordance with the invention, in which arrangement is included a part rendering inactive not properly demodulated signals.

Fig. 4 is a block diagram of a receiving arrangement designed in accordance with the invention in which arrangement is inserted a special part designed to render inefficient any signal whose demodulation is not affected in a proper way, i. e., with the help of a demodulating voltage undergoing exactly the same phase variations as those used at the transmission end.

As explained above, only when demodulated by an oscillation undergoing exactly the same phase variations does a phase varied sub-carrier provide merely two waves and no additional elements, namely, (*a*) the signal current, and (*b*) an oscillation whose frequency is double that of the sub-carrier used, which oscillation is modulated by the signal current. Anytime when there exists no precise synchronism between the phase variations of the sub-carrier to be demodulated and those of the demodulating oscillation, the output of the demodulator contains, besides the signal current and the wave whose frequency is double that of the sub-carrier used, a certain number of other waves of different frequencies.

The phase variations to which are submitted the sub-carriers are supposed to be (in a purely illustrative way) periodical inversions of polarity or sign. It is evident that these phase variations are equivalent to amplitude modulations. In fact, so far as periodical inversions of polarity are concerned, they are equivalent to the modulation of the wave undergoing these variations, by a function of time whose value jumps periodically from $+1$ to $-1$ and back.

If a modulated sub-carrier undergoing periodical inversions of polarity is demodulated by a demodulating oscillation undergoing exactly the same periodical inversions of polarity, there will appear in the output of the demodulator only and exclusively two waves having both constant phases. One of these two waves will be the signal which was impressed on the sub-carrier, while the second wave will be an oscillation whose frequency is double that of the sub-carrier, this oscillation being modulated by the above said signal.

In fact, if the signal impressed on the sub-carrier is designated by $\sin \Omega t$ and if the frequency of the sub-carrier is equal to $$\frac{\omega}{2\pi}$$

the phase varied modulated sub-carrier will form a sequence of intervals during which the considered sub-carrier will alternately have the form of $+\sin \Omega t \sin \omega t$ and of $-\sin \Omega t \sin \omega t$.

If the demodulating oscillation undergoes exactly the same periodical inversions of polarity, it will have the form $+\sin \omega t$ when the modulated sub-carrier has the form $+\sin \Omega t \sin \omega t$; and it will have the form $-\sin \omega t$ when the modulated sub-carrier has the form $-\sin \Omega t \sin \omega t$.

In other words, at any given moment the result of the modulated sub-carrier and the demodulating oscillation will be either $$(+\sin \Omega t \sin \omega t)\ (+\sin \omega t)$$
$$(-\sin \Omega t \sin \omega t)\ (-\sin \omega t)$$

In both cases the result will be:

$$+\sin \Omega t \sin^2 \omega t = +\sin \Omega t\left(\frac{1-\cos 2\omega t}{2}\right) = \tfrac{1}{2} \sin \Omega t - \tfrac{1}{2} \sin \Omega t \cos 2\omega t$$

Both waves obtained in such a way have constant phases, and the output of the demodulator is constituted only and exclusively by three continuous waves, namely, (1) $\sin \Omega t$; (2) $\sin (2\omega-\Omega)t$ and (3) $\sin (2\omega+\Omega)t$.

The result is entirely different if either the demodulating voltage or the sub-carrier has a constant phase, while the corresponding element conveyed to the demodulator, undergoes periodical inversions of polarity.

Under those conditions the output of the demodulator will alternately be $$+\sin \Omega t \sin^2 \omega t = +\tfrac{1}{2} \sin \Omega t - \tfrac{1}{2} \sin \Omega t \cos 2\omega t$$

and $$-\sin \Omega t \sin^2 \omega t = -\tfrac{1}{2} \sin \Omega t + \tfrac{1}{2} \sin \Omega t \cos 2\omega t$$

In other words, this output will be constituted, (1) by the signal undergoing periodical inversions of polarity, and (2) by a wave whose frequency is double that of the sub-carrier, which wave is modulated by the signal and undergoes the same periodical inversions of polarity as the sub-carrier from which it is derived.

It is obvious that an aggregate of waves constituted as just outlined will always contain much more than three continuous oscillations.

If both the sub-carrier and the demodulating oscillation undergo periodical inversions of polarity, but if these inversions are not exactly the same in the two considered elements, there will be no regular demodulation and a very complicated plurality of frequencies will appear in the output of the demodulator. It can be readily seen that there will appear in the output of the demodulator:

(*a*) The signal undergoing periodical inversions of polarity varying within the time, and (*b*) A wave modulated by the signal and having a frequency double that of the sub-carrier, which wave undergoes periodical inversions of polarity similar to that of the signal.

One of the essential features of the invention consists in the fact that the control operations are effected only and exclusively when a regular and perfect demodulation takes place, i. e., when the products of this demodulation do not undergo any more periodical inversions of polarity or other phase variations. This result can be easily obtained, for instance, in the following way:

The output of the demodulator designed to transform the modulated phase-varied sub-carrier into the signal current is divided into two parallel channels. One of these channels contains the signal filter, i. e., a band pass filter selecting a very narrow band around the frequency of the signal current. The second channel contains also a band pass filter which has, however, entirely different characteristics. It selects a much broader band than that selected by the signal filter and this comparatively wide band is located outside the signal frequency, somewhere between this frequency and the double frequency of the sub-carrier. The characteristics of this second band pass filter must be such that a wave, whose frequency is double that of the sub-carrier and which is modulated by the signal, is practically rejected.

If the demodulation is regular and perfect, i. e., if a phase varied sub-carrier is demodulated by a demodulating oscillation having exactly the same phase variations, the filter contained in the second channel just described will provide no output current or output voltage, since no frequency located between that of the signal current and that of the wave modulated by the signal and having a carrier frequency double that of the sub-carrier used, will appear in the output of the demodulator. In fact, when a phase varied sub-carrier is demodulated by an oscillation having exactly the same phase variations, there will appear in the output of the demodulator only and exclusively two elements, namely: (*a*) the signal current; (*b*) a wave modulated by the signal and having the frequency double that of the sub-carrier.

On the other hand, if the demodulation if not perfect, i. e., if the sub-carrier to be demodulated and the demodulating oscillation have not exactly the same phase variations, the demodulator will provide, besides the two elements mentioned above, a plurality of frequencies located between the frequency of the signal and the double frequency of the sub-carrier, i. e., within the band selected by the second band pass filter.

This means that if the enemy does not succeed in reproducing very faithfully our phase varied signalling, his interfering transmission will create in our receiving arrangements two elements (instead of the single current created by our control transmission). These two elements are:

(*a*) The signal current provided by the signal filter included in the first channel, and
(*b*) A plurality of oscillations picked up by the filter included in the second channel.

This important difference between the result of our signalling and that of the enemy transmission can be used in the following way, in order to render ineffective the enemy interference:

The output of the signal filter can be conveyed through a biased tube permanently blocked. The deblocking of said tube is effected by the signal itself, which, for this purpose, is submitted in a parallel channel to a rectifying operation and then applied to the proper grid of the biased tube. The grid in question is submitted at the same time to the action of a second voltage provided by the rectification of the plurality of oscillations picked up, as described above, by the second band pass filter. This second voltage must be superimposed on the first voltage in a subtractive way. In other words, the rectified voltage coming from the signal current must be positive, while the rectified voltage coming from the second filter must be negative.

In the absence of our own transmission, the enemy's signalling will create in our receiving arrangement two biasing voltages of opposite signs and of approximately the same order of magnitude. These two voltages will compensate each other and no deblocking effect will be obtained.

As soon, however, as our own signalling reaches the receiving arrangement, a second positive deblocking voltage will be created, which will not be compensated by an additional negative voltage. Under those conditions the deblocking effect will take place, the signal current will pass through the biased tube and the control operation will be executed.

The same principle can be applied to any kind of radio communications, for instance, to radio telegraphic and radio telephonic transmission, to wireless facsimile transmissions, etc. In fact, if the signals in question (i. e., speech, music, telegraphic or teleprint signals, facsimile currents, etc.) are impressed on phase varied or frequency varied sub-carriers, a perfect demodulation of such phase-varied or frequency-varied sub-carriers will provide only and exclusively two elements, namely:

(*a*) The signal currents, (*b*) A wave having a carrier frequency double that of the sub-carrier used, this wave being modulated by the signals.

On the other hand, when the demodulation is "irregular," i. e., when the sub-carrier and the demodulating oscillation undergo different phase variations or frequency variations, there will appear in the output of the demodulator not only the elements (*a*) and (*b*) mentioned above, but also a plurality of additional oscillations, located between the two elements referred to above.

It may be added that the problem of an appropriated constance adjustment of the two opposite voltages can be solved by comparatively simple means, due to the fact that the energy of the frequency spectrum picked up by the second filter remains almost the same for any discrepancy whatsoever between the phase variations of the sub-carrier and those of the demodulation oscillation. That is especially true so far as periodical inversions of polarity are concerned.

The block diagram shown in Fig. 4 illustrates the receiving arrangement to be used in accordance with the proposed protected control system.

The reference characters 41, 42, 43 and 44 represent the usual parts of a conventional receiver: 41 is a frequency changer; 42 the intermediate frequency amplifier; 43, the detector; and 44, the low frequency amplifier. The term "low frequency," as applied to the present system, designates a range extending up to 40 or 50 kilocycles, since the sub-carrier used should have a frequency of at least 15,000 cycles and the frequency of the periodical inversions of polarity is of the order of magnitude of 5,000 cycles.

The output of the low frequency amplifier 44 is divided into two parallel channels, one of which includes the band pass filter 24 selecting a band located between the frequencies $(n-S)$ and $(n+S)$, $n$ designating the frequency of the sub-carrier, while S is the frequency of the phase variations. The second channel comprises no additional element. Both channels are fed to the modulator 25 whose output is connected with band pass filter 47 selecting the frequency $n$. The filter 47 must have a very narrow passing band. The output of filter 47 constituted by the frequency standard is fed to a device 48 designed to extract a determined sub-harmonic of this frequency standard (for instance, its 4th sub-harmonic). This sub-harmonic is fed to to multi-vibrator 49 designed to produce the harmonics to be used as sub-carrier and as synchronizing oscillation applied to the electronic switch. These harmonics are selected respectively by selector 10 and selector 11.

The output of selector 11 providing the sub-carrier is divided into two parallel channels, one of which includes a buffer shifting the phase of the incoming oscillation by 180°. The second channel does not contain any additional element. Both channels are conveyed to the electronic switch 13 synchronized by the oscillation provided by selector 11.

The electronic switch 13 provides the demodulating oscillation having the same frequency as the incoming sub-carrier and undergoing the same periodical polarity inversion as this carrier.

The demodulation is effected in a (double balanced) demodulator 14 acted upon by the output of the low frequency amplifier 4 and the demodulating oscillation coming from the electronic switch 13.

The output of demodulator 14 is divided into two parallel channels. One of these channels contains the collection of signal filters used, which filters are all inserted in parallel. Reference character 15 designates one of these filters, which is supposed to select the signal received. The output of this filter is fed to a biased tube 17 and, in a parallel way, to a rectifier 18 supplying a positive deblocking voltage, which is applied to the proper grid of the biased tube 17.

The second channel coming from demodulator 14 contains a band pass filter 16 selecting a plurality of oscillations located between the band of the signal frequencies and the double frequency of the employed sub-carrier.

The output of 16 is conveyed to the rectifier 19, which provides the negative voltage to be applied to tube 17, as described above.

It will be understood that various features and principles of each of the embodiments of the invention above described or referred to may be utilized or substituted in the other embodiments.

While the invention has been described in detail with respect to certain particular preferred examples, it will be understood by those skilled in the art, after understanding the invention, that various changes and further modifications may be made without departing from the spirit and scope of the invention.

What is claimed as new and desired to be secured by Letters Patent is:

1. In a system of protecting radio signalling against interference, which system uses phase or frequency varied carrier oscillations on which are impressed signals to be transmitted, means for generating at a transmitting end a continuous oscillation; means for distorting the shape of said oscillation so as to produce a sequence of its harmonics; means for selecting one of said harmonics to form a carrier oscillation; means for selecting another of said harmonics to form a controlling oscillation for determining the frequency of the periodical phase or frequency variations to be used; means for selecting a third harmonic to be used as a frequency standard which is transmitted to a receiving end; means for picking up at the receiving end said frequency standard; means for deriving from the frequency standard its sub-harmonic corresponding to the initial continuous oscillation generated at the transmitting end; means for distorting the shape of said sub-harmonic similarly to the distortion of the continuous oscillation at the transmitting end so as to produce a sequence of harmonics; means for selecting one of said sequence of harmonics to form a demodulating oscillation; and means for selecting another of said sequence of harmonics to form a controlling oscillation which determines the frequency of the phase or frequency variation of this oscillation.

2. In a system of protecting radio signalling against jamming which is based on transmitting signals on phase or frequency varied carrier waves and demodulating these waves at the receiving end by phase or frequency varied demodulating oscillations undergoing exactly the same phase or frequency variations as those of the transmitted carrier waves, means for producing at the transmitting end a fundamental continuous oscillation of predetermined frequency; means for distorting the shape of said oscillation so as to obtain a sequence of its harmonics; means for selecting one of these harmonics to use it as carrier or sub-carrier on which is transmitted the signal; means for selecting a second harmonic to use it as a controlling frequency for determining the frequency of the phase or frequency variations used; means for selecting a third harmonic to be used as a frequency standard which is transmitted to the receiving end; means for detecting this frequency standard at the receiving end; means for deriving from the detected frequency standard the fundamental used at the transmitting end to produce the three harmonics used as carrier or sub-carrier, as controlling oscillation for determining the frequency of the phase or frequency variations used, and as frequency standard; means for distorting the shape of the said fundamental oscillations so as to produce a sequence of its harmonics; means for selecting the harmonic having the same frequency as the carrier or sub-carrier on which is transmitted the signal to use it as demodulating oscillations; and means for selecting the harmonic having the same frequency as the phase or frequency variations of the carrier or sub-carrier to use it as controlling oscillation for determining the frequency of the phase or frequency variations of the demodulating oscillation.

3. In a system for protecting radio signalling against jamming, a local oscillator at the transmitting end providing a continuous oscillation of predetermined although arbitrary frequency; means for distorting the shape of this oscillation and thus producing a sequence of its harmonics; means for selecting three of these harmonics, one of them to be used as a carrier, the second to be used as a controlling or synchronizing oscillation for determining the frequency of periodical phase variations, and the third to be used as a frequency standard designed to be transmitted to the receiving end; means to divide the harmonic selected to be used as carrier into two portions, having equal amplitudes but being displaced in phase by 180 degrees; means to periodically and alternately switch on and switch off the two above said portions, so as to form an oscillation the phase of which undergoes periodical inversions; means to control the frequency of these periodical inversions with the help of the harmonic selected to be used as controlling or synchronizing oscillation; means for modulating the thus produced phase varied carrier by the signal or signals to be transmitted; means for transmitting the thus created phase varied carrier wave with the signal impressed thereon, to the receiving end; means for impressing the harmonic selected to be used as frequency standard on a carrier and to transmit the latter to the receiving end; at this receiving end means for picking up and amplifying the phase varied carrier wave on which are impressed the signals; means for picking up the carrier on which is impressed the frequency standard and to detect the latter; means for deriving from the detected frequency standard its sub-harmonic corresponding to the fundamental continuous oscillation generated at the transmitting end; means for distorting the shape of this sub-harmonic so as to produce a sequence of oscillations, the frequencies of which are multiples of the said sub-harmonic; means for selecting two of these oscillations, one of them having the same frequency as that of the phase varied carrier wave, on which are impressed the signals, to be used as demodulating oscillation, while the second selected oscillation, having the same frequency as the controlling or synchronizing oscillation used at the transmission end, is used as a controlling or synchronizing oscillation to determine the frequency of the phase variations of the demodulating oscillation; means for dividing the oscillation selected to be used as demodulating oscillation into two portions, having both the same amplitude but being out of phase by 180 degrees; means for periodically and alternately switching on and switching off the said two portions so as to produce an oscillation undergoing periodical phase inversions, the frequency of these periodical phase inversions being controlled by the controlling or synchronizing oscillation referred to above; means for feeding the picked up phase varied carrier wave, on which are impressed the signals, and the just described phase varied demodulating oscillation, to a demodulator wherein the phase varied carrier wave is demodulated by the phase varied demodulating oscillation, having the same frequency and the same phase variations as said carrier wave, so that this demodulating operation provides a completely undistorted signal; means for feeding the undistorted signal to a thermionic tube, and means for varying the internal resistance of said tube in synchronism and in accordance with any distorting modulation of the signal.

References Cited in the file of this patent

UNITED STATES PATENTS

| | | |
|---|---|---|
| 1,309,459 | Carson | July 8, 1919 |
| 1,454,532 | Beatty | May 8, 1923 |
| 1,610,329 | Shivers | Dec. 14, 1926 |
| 1,612,284 | Hammond, Jr. | Dec. 28, 1926 |
| 1,744,044 | Green | Jan. 21, 1930 |
| 1,747,160 | Carpe | Feb. 18, 1930 |
| 1,922,282 | Bellescize | Aug. 15, 1933 |
| 2,175,270 | Koch | Oct. 10, 1939 |
| 2,199,634 | Koch | May 7, 1940 |
| 2,262,764 | Hull | Nov. 18, 1941 |
| 2,283,575 | Roberts | May 19, 1942 |
| 2,340,432 | Schock | Feb. 1, 1944 |
| 2,406,881 | Young | Sept. 3, 1946 |
| 2,416,336 | Marchand | Feb. 25, 1947 |
| 2,425,020 | Young | Aug. 5, 1947 |
| 2,448,055 | Silver et al. | Aug. 31, 1948 |
| 2,455,616 | Shephard | Dec. 7, 1948 |
| 2,457,288 | Usselman | Dec. 28, 1948 |